(No Model.)

D. A. BRISLIN.
PIPE JOINT.

No. 267,401. Patented Nov. 14, 1882.

Attest:
Charles Pickles
Saml. S. Boyd

Inventor:
David A. Brislin
by C D Moody
atty

N. PETERS, Photo-Lithographer, Washington, D. C.

UNITED STATES PATENT OFFICE.

DAVID A. BRISLIN, OF ST. LOUIS, MISSOURI.

PIPE-JOINT.

SPECIFICATION forming part of Letters Patent No. 267,401, dated November 14, 1882.

Application filed May 9, 1882. (No model.)

*To all whom it may concern:*

Be it known that I, DAVID A. BRISLIN, of St. Louis, Missouri, have made a new and useful Improvement in Pipe-Joints, of which the following is a full, clear, and exact description, reference being had to the annexed drawings, making part of this specification, in which—

Figure 1:
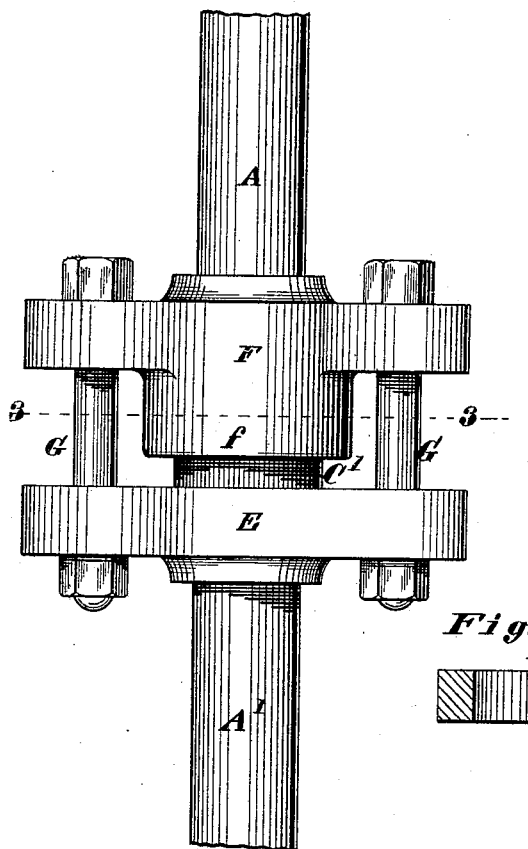
Figure 2:
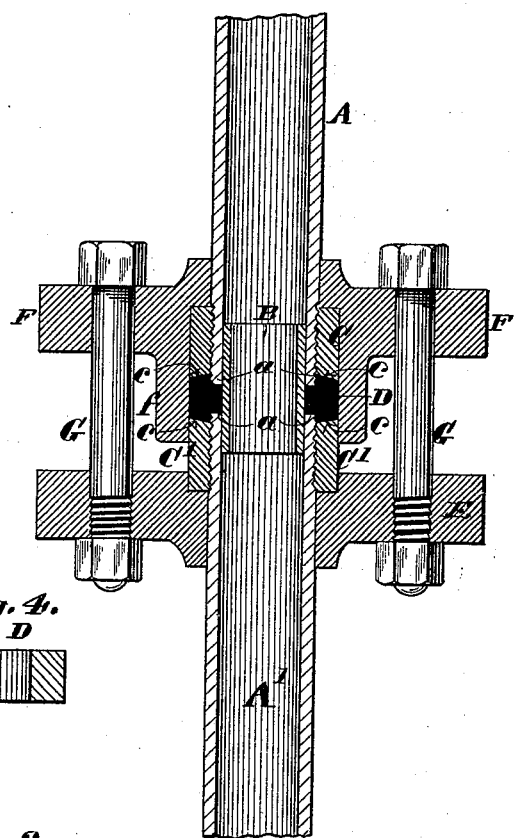
Figure 4:
Figure 3:
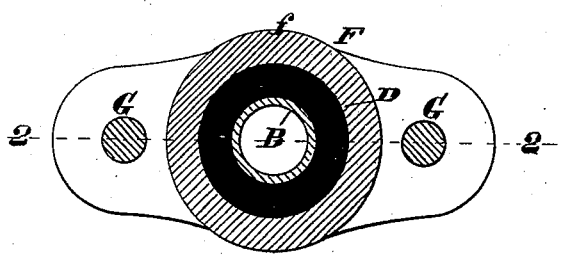

Figure 1 is a side elevation of the improved joint; Fig. 2, a longitudinal section taken on the line 2 2 of Fig. 3; Fig. 3, a cross-section taken on the line 3 3 of Fig. 2, and Fig. 4 a section of the packing-ring.

The same letters denote the same parts.

The present invention is an improved means for rendering a pipe-joint tight. It also relates to the means for preventing the contents of the pipes from escaping in any measurable degree when the joint is being repaired.

The improvement is designed more especially for pipes containing extremely volatile and penetrating gases, such as ammoniacal gases.

A A' represent the pipes to be joined. A nipple, B, extends across the joint, projecting and fitting closely into the opposing pipes. C C' are collars secured to the pipes. They can be screwed, welded, or otherwise attached to the pipes; or they can be made part of the pipes. Between the pipes and passing around the nipple B is a packing-ring, D, of rubber or other material suitable for packing.

E F are backing flanges, connected respectively with the pipes A A', one, E, coming against the collar C, and the other, F, against the collar C', and the two flanges being connected by means of the bolts G G. The flange F is provided with an extension, *f*, that projects sufficiently to come, when the joint is made, over the packing-ring D, and confine the latter between the ends of the pipes, and the extension is projected preferably beyond the packing-ring and onto the collar C, and to fit the latter closely.

In forming the joint, the nipple B being in place within the pipes, and the packing-ring D between the ends of the pipes and the collars, the flanges E F are drawn together by means of the bolts G. The effect is to compress the packing-ring, and to force it closely into every part of the space between the pipes in a longitudinal direction, and between the nipple and the extension *f* in a transverse direction. The joint is thus tightly closed at all points, and at the same time the ring, by reason of the internal support furnished by the nipple and the external support furnished by the extension *f*, is held in place.

Any suitable shape can be given to the ends *a c a c* of the opposing pipes and collars. The preferable one is that shown, the ends *a a* of the pipes A A' being squared, and the ends *c c* of the collars C C' being made to come slightly farther apart than the ends *a a*, and being beveled inwardly.

When the packing-ring needs to be renewed the bolts G are loosened, the flange F slipped back, and the ring D withdrawn from between the pipes. Now, in this conditon of the parts, the gas would escape from the pipes in such a quantity as to materially interfere with the operation were it not for the nipple B. The latter, fitting closely in the pipes, prevents the gas from escaping in a degree to be troublesome, and a new packing-ring can, by dividing it, be passed around the nipple between the pipes, and then, by drawing the flanges E F together again—an operation readily performed—the joint is renewed.

In addition to hindering the escape of the gas, the nipple also serves to support the packing-ring and to prevent the pipes from sagging.

By reason of the shape of the opposing ends *a c a c* the ring is confined transversely in its place between the pipes.

I claim—

1. In combination, the pipes A A', the collars C C', the packing-ring D, the flange E, the flange F, having the extension *f*, and the bolts G G, said packing-ring being held between the pipe ends and underneath said flange-extension, substantially as described.

2. In combination, the pipes A A', the nipple B, the collars C C', the ring D, the flange E, the flange F, having the extension *f*, and the bolts G G, substantially as described.

3. In combination, the pipes A A', the collars C C', and the ring D, the latter, when the pipes are drawn together against the ring, being confined externally by the part *f*, and being held between the pipe ends.

4. In combination, the pipes A A', the collars C C', and the ring D, said ring being held between the pipe ends, and also transversely in the pipe, being confined externally and supported internally.

5. The pipes A A' and the collars C C', having the ends *a c a c*, shaped as described, in combination with the ring D, the flanges E F, and the bolts G G, said pipes and collars, in forming the joint, being drawn together and holding the ring between said ends *a c a c*.

DAVID A. BRISLIN.

Witnesses:
C. D. MOODY,
CHARLES PICKLES.